May 22, 1951 C. C. SMITH 2,554,349
TWO-FILM CAMERA
Filed July 31, 1948
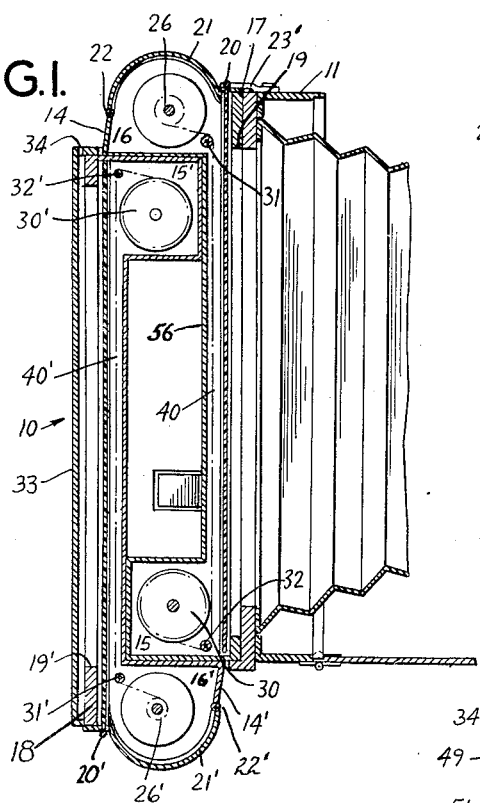
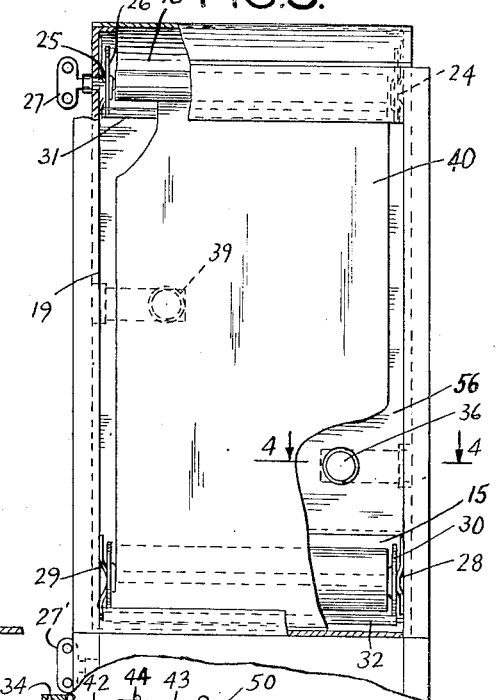
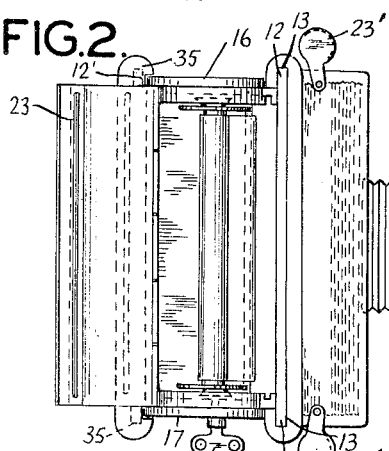
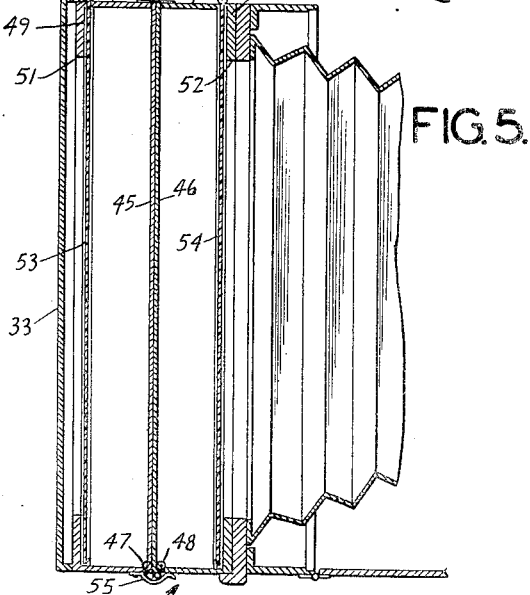
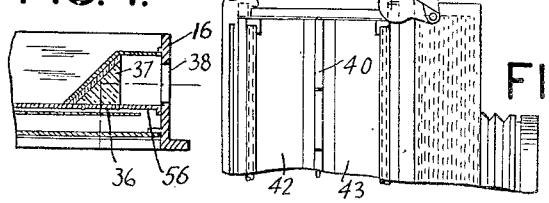
INVENTOR
CLARENCE C. SMITH
BY
Campbell, Brumbaugh, Free & Graves
his ATTORNEYS.

Patented May 22, 1951

2,554,349

UNITED STATES PATENT OFFICE 2,554,349

TWO-FILM CAMERA

Clarence C. Smith, Flushing, N. Y.

Application July 31, 1948, Serial No. 41,782

5 Claims. (Cl. 95—34)

The present invention relates to photographic apparatus and more specifically to new and improved camera construction in which either of two films can be exposed selectively, as desired, to photograph a subject.

With the advent of color film of different sizes for roll film cameras, color photography has achieved widespread popularity. However, it happens all too frequently that, at the time a person desires to take a picture in color, his camera is found to be loaded with unexposed black and white film. In such case, it is generally not desired to remove the black and white film from the camera until it has been exposed, so that the picture is taken either in black and white or not at all. One solution to this problem, of course, is to use two cameras loaded with black and white film and color film, respectively, but this is unsatisfactory at best because the second camera is an added expense and is an extra piece of equipment to be carried about.

The principal object of the invention, accordingly, is to provide new and improved camera apparatus which is adapted to carry at least two films, either of which may be exposed selectively, as desired.

Another object of the invention is to provide new and improved camera apparatus of the above character which is simple and compact in construction yet highly effective in operation.

A further object of the invention is to provide new and improved camera apparatus of the above character having a holder for two films which is adapted to be assembled detachably and reversibly to a camera.

Still another object of the invention is to provide new and improved camera apparatus of the above character which embodies means to enable the exposure numbers printed on the backing paper of both film rolls to be readily viewed.

According to the invention, a film holder is provided which is adapted to be releasably assembled to a camera in a manner similar to the usual film pack holder. The holder is adapted to contain two photographic films, the photosensitive surfaces of which face the front and back, respectively, of the device. Safety slides, or the like, are provided for protecting the two films from light prior to exposure in the camera. The holder is adapted to be assembled to the camera with either film facing the lens thereof so that either film can be made available for exposure selectively merely by assembling the holder to the camera in the proper relationship.

In one embodiment designed for use with roll film, mountings for pairs of spools are disposed at opposite ends of the holder, each pair comprising a supply spool for supplying film from one roll to a takeup spool at the opposite end of the holder, and a takeup spool for film from another roll on a supply spool at the opposite end of the holder. Between the spools lies an exposure zone in which the two films are supported back to back, and safety slides are provided for protecting the two films prior to exposure in the camera.

Another embodiment intended for use with cut film or film packs is provided with two separate compartments hinged at one end, each of which may have an openable closure by means of which two film packs may be placed in the holder. Means are provided for retaining the two portions of the holder together, and the holder is adapted to be assembled to a camera with either film containing portion facing the camera lens.

If desired, either form of the invention may be provided with a back having a slot therein to receive the safety slide for the particular film which is being used.

Additional objects and advantages of the invention will become apparent from the following detailed description of several representative embodiments, taken in conjunction with the accompanying drawing in which:

Fig. 1 is a side view in longitudinal section of camera apparatus constructed according to the invention;

Fig. 2 is a top view of the camera shown in Fig. 1 with the upper spool cover in open position and the bellows closed;

Fig. 3 is a front view of the film holder of Fig. 1, partially broken away to show one of the exposure number viewing windows;

Fig. 4 is a detail view in transverse section taken along line 4—4 of Fig. 3, looking in the direction of the arrows, and showing the mechanism for viewing the film exposure numbers on the back of one film;

Fig. 5 is a view in longitudinal section of a modification designed for use with film packs; and Fig. 6 is a partial top view of the camera shown in Fig. 5.

In the typical form of the invention shown in Fig. 1, which is designed for use with roll film, a film holder 10 is shown which is adapted to be slidably assembled to the back of a conventional type camera 11 in any suitable manner, as, for example, by lateral ribs 12 (Fig. 2), slidable in slots 13 formed at the rear of the camera. The holder 10 comprises a pair of substantially identical closed compartments 14 and 14' which are mounted in inverted relation to one another, as shown, and which may be held in assembled relation by side plates 16 and 17 (Fig. 2), for example. Since the compartments 14 and 14' are substantially identical, it will be necessary to describe only one in detail. Corresponding parts of the other will be designated by corresponding primed reference characters.

The compartment 14 comprises a film supply spool chamber 15, a film takeup spool chamber 16 and front and back walls 17 and 18. It is light-tight except for a substantially rectangular film exposing aperture 19 (Fig. 3) formed in the front wall thereof which is normally closed by suitable means such as a conventional safety slide 20. The details of safety slides and their mountings are well known and they need not be given here.

The takeup film spool chamber 16 is provided with a cover 21 which is hinged at 22. The cover 21 may be provided with a slot 23 (Fig. 2) parallel to one edge through which the safety slide 20 may be passed. With this construction, the safety slide 20 serves to lock the cover 21 in the closed position. When the holder 10 is assembled to the camera 11, as shown in Figs. 1 and 2, the latch 23' which locks the holder 10 to the camera 11 also locks the cover 21 so that the latter cannot open inadvertently when the slide 20 is removed.

At the opposite sides of the chamber 16 (Fig. 3) are conventional mountings 24 and 25 for a film takeup spool 26 and the mounting 25 is provided with a film winding key 27. Also, mountings 28 and 29 for a film supply spool 30 are provided in the chamber 15, and idler rollers 31 and 32 are mounted near the opposite edges of the aperture 19, as shown.

If desired, the holder 10 may be provided with a detachable back 33 having a slot 34 therein to receive whichever of the safety slides 20 or 20' is not in use while a picture is being taken. The back may have grooves 35 formed therein so that it can be slid over the ribs 12 or 12' of the holder 10. The back 33 may be provided with a door (not shown) as in the conventional film pack holder, on the inside of which may be disposed an exposure table or other useful information.

With the construction described above, the two films in the holder 10 are disposed back to back so that the exposure numbers on the film backing papers face one another inside the holder 10. In order that the exposure numbers may be readily viewed from outside the camera, suitable viewing mechanisms are provided. Thus, the exposures on the backing paper for the film from the supply spool 30 are viewed through a window 36 of suitably colored glass mounted in the rear wall 56 of the compartment 14 in registry with the path taken by the exposure numbers. Light reflected from the film backing paper is directed by a suitable 45° reflector such as a prism 37, for example, to a viewing window 38 formed in the side 16 of the holder, as shown in greater detail in Fig. 4. A similar viewing window 38 (Fig. 3) and prism (not shown) may be provided for viewing the exposure numbers on the backing paper of the film from the supply spool 30' in the compartment 14'.

In operation, the safety slides 20 and 20' are removed so that the top and bottom cover members 21 and 21' can be tipped back. A spool of film 30' is then mounted in the chamber 15' and its backing paper is threaded over the idler rollers 32' and 31' to the takeup spool 26. The film can be started in the usual manner by means of the film winding key 27' (Fig. 3). A second spool 30 is then mounted in the chamber 15 and the film backing paper is threaded over the idler rollers 32 and 31 to the takeup spool 26, the film being advanced by the film winding key 27 (Fig. 3). The top and bottom cover member 21 and 21' are then closed and secured in position by inserting the safety slides 20 and 20'. The two films 40 and 40' may then be moved by means of the winding keys 27 and 27', respectively, until each is ready for the first exposure as indicated by the number appearing in the corresponding viewing window 38 or 38' in the side of the holder 10.

The holder 10 is then assembled to the back of the camera 11 by sliding the ribs 12 into the slots 13, and is retained securely in position by means of the catch 23' which serves as a catch for the top cover member 21, as indicated above. The safety slide 20 is then removed and placed in the slot 34 in the back 33, whereupon the camera is ready for taking pictures.

It will be understood that the spools 30 and 30' may comprise color film and black and white film, respectively, and that either one can be used for taking pictures merely by assembling the holder 10 to the camera 11 so that the proper film faces the camera lens. If desired, full rolls of unexposed film may be substituted for the spools 30' and 26', for example, in which case the compartment 14' provides a convenient storage place for two additional rolls of film.

Figs. 5 and 6 illustrate a modification which is designed primarily for use with film packs. In this form of the invention, a holder 41 is provided which may comprise, for example, two substantially rectangular containers 42 and 43 hinged together in any convenient manner at 44 and provided with covers 45 and 46 hinged at 47 and 48, respectively. The opposite sides 49 and 50, respectively, may be provided with rectangular apertures 51 and 52 through which the film may be exposed and which may be normally covered by safety slides 53 and 54, of any suitable type. A conventional type catch 55 may be provided for retaining the two holder portions 42 and 43 in assembled relationship and lateral ribs 44 may be provided at the opposite sides 49 and 50 to facilitate assembling the holder to a conventional type camera 11.

In operation of the embodiment shown in Figs. 5 and 6, the catch 55 is released to permit the two holder portions 42 and 43 to be brought substantially into alignment so that the covers 45 and 46 can be raised. Two film packs are then inserted in the container portions 42 and 43 and the covers 45 and 46 closed. The two container portions 42 and 43 are then moved to the position shown in Fig. 5 and the catch 55 is snapped into position. The holder is then assembled to the camera 11 and the safety slide 54 removed so that the film pack in the container 49 is ready for taking pictures. The back 33 may be mounted on the holder 41 and the slide 54 stored in the slot 34 until needed. The manner of preparing the several films in a film pack for exposure is well known in the art and, therefore it will not be described herein.

From the foregoing, it will be understood that the invention provides novel and highly effective camera apparatus which enables pictures to be taken either in color or in black and white, selectively, with a single camera. By virtue of the novel construction shown, the holder for the two films can easily be made to approximate the width of a standard roll film or film pack camera, so that it can be conveniently handled. Further, by providing angled reflectors with suitable viewing windows in the space between the two films of the roll film embodiment, the exposure numbers on the film backing paper of the two films can be readily observed.

While several specific embodiments have been described in detail above for purposes of illustration, the invention is not intended to be in any way limited thereby, but is susceptible of numerous modifications in form and detail within the scope of the following claims.

I claim:

1. In photographic apparatus, a film holder comprising adjacent light-tight film compartments, each of said compartments having film spool receiving chambers disposed at opposite ends thereof and a channel portion extending therebetween, means forming film exposure windows in the outside walls of said compartment channel portions, respectively, openable closure means for said windows, means forming a film exposure number viewing window in the inside wall of at least one of said compartment channel portions, optical means disposed between said compartment channel portions for permitting observation of exposure numbers viewed through said viewing window, film spool mounting means in each of said compartment chambers, means in each of said compartments for supporting film in a plane viewable through the corresponding film exposure window, and means for facilitating assembly of said holder detachably to a camera with either compartment film exposure window facing the lens thereof.

2. In photographic apparatus, a film holder comprising a film receiving compartment having film spool receiving chambers at opposite ends thereof and a channel portion extending therebetween, means forming a film spool access opening communicating with one of said compartment chambers, means forming a film exposing window in one wall of said channel portion, film spool mounting means in each of said chambers, means in said compartment for supporting film in a plane viewable through said window, a cover hingedly mounted on said one compartment chamber for the film spool access opening therein, openable closure means for said exposing window and having a portion adapted to cooperate with a portion of said cover to retain the same closed, means forming an exposure number viewing window in another wall of said compartment channel portion, and optical means permitting observation, from a side of said holder, of exposure numbers viewed through said viewing window.

3. In combination with a camera having an opening at the back thereof adapted to receive a film holder, a film holder comprising a pair of compartments, each having film spool receiving chambers at opposite ends thereof and channel portions extending therebetween, means forming film spool access openings communicating with one chamber in each of said compartments, respectively, a cover hingedly mounted on said one chamber of each compartment for the film spool access opening therein, means forming film exposing windows in the outside walls of said compartment channel portions, openable closure means for said windows, each of said closure means having a portion adapted to cooperate with a portion of the cover member of the corresponding compartment to retain the same closed, means forming exposure number viewing windows in the inside walls of said compartment channel portions, reflector members mounted between said compartment channel portions and disposed at angles to permit observation from the sides of said holder of exposure numbers viewed through said respective exposure number viewing windows, and means for facilitating assembly of said holder detachably to said camera with either film exposing window facing said camera opening.

4. In photographic apparatus, a film holder comprising a film receiving compartment having film spool receiving chambers at opposite ends thereof and a film conduit portion connecting said film spool receiving chambers, means forming a film spool access opening communicating with one of said chambers, means forming a film exposing window in one wall of said film conduit portion, film spool mounting means in each of said chambers, roller means mounted in said compartment so as to support film therein in a plane viewable through said window, a cover for said film access opening hingedly mounted on said one compartment chamber about an axis parallel to the axis of said spool mounting means and having a portion overlying said one wall of the film conduit portion, safety slide means removably mounted in said holder for closing said exposing window and having a portion adapted to cooperate with said cover overlying portion to retain the cover closed when the slide means is in the closed position, means forming an exposure number viewing window in another wall of said film conduit portion and reflector means mounted adjacent said exposure number viewing window and disposed at an angle to permit observation of film exposure numbers from a side of the holder.

5. In combination with a camera having an opening at the back thereof adapted to receive a film holder, a film holder comprising a pair of adjacent film receiving compartments each having film supply spool and film take-up spool receiving chambers at opposite ends thereof connected by a film conduit portion, means forming film spool access openings communicating with the endmost spool receiving chamber in each compartment, respectively, means forming film exposing windows in the outer walls of said film conduit portions, respectively, film spool mounting means in each of said chambers disposed parallel to each other in a row extending lengthwise of the holder, a plurality of roller means in said holder for supporting film extending between each supply spool and its take-up spool in a plane viewable through the corresponding film exposing window, covers for said film spool access openings hingedly mounted on said endmost spool receiving chambers, respectively, about axes parallel to the axes of said film spool mounting means, each of said covers having a portion overlying an outer wall of a film conduit portion, respectively, a plurality of safety slide means removably mounted in said holder for closing said film exposing windows, respectively, each of said safety slide means having a portion adapted to cooperate with the portion of a corresponding cover which overlies an outside wall of a film conduit portion to retain said cover closed when the safety slide means is in the closed position, means forming exposure number viewing windows in the interior walls of said film conduit portions, respectively, reflector means mounted adjacent said respective exposure number viewing windows and disposed at angles to permit observation of film exposure numbers from opposite sides of said holder, respectively, film advancing means mounted on one side of said holder near one end thereof and connected to one of said film spool mounting means, second film advancing means mounted on the other side of said holder near the other end thereof and connected to another of said film spool mounting means, and means for facilitating assembly of said holder detachably to said camera with either film exposing window facing said camera opening.

CLARENCE C. SMITH.

REFERENCES CITED

The following references are of record in the file of this patent:

UNITED STATES PATENTS

| Number | Name | Date |
|---|---|---|
| 1,940,187 | Salchow | Dec. 19, 1933 |
| 2,245,606 | Rauch | June 17, 1941 |
| 2,410,919 | Aiken | Nov. 12, 1946 |
| 2,439,112 | Teague | Apr. 6, 1948 |
| 2,462,713 | Bilofsky | Feb. 22, 1949 |